(12) United States Patent
Kim et al.

(10) Patent No.: US 11,703,676 B2
(45) Date of Patent: Jul. 18, 2023

(54) OPTICAL RECEIVING MODULE

(71) Applicant: Hyundai Mobis Co., Ltd., Seoul (KR)

(72) Inventors: Young Shin Kim, Yongin-si (KR); Sung Eun Jo, Yongin-si (KR); Kyung Rin Kim, Yongin-si (KR); Won Gyum Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 862 days.

(21) Appl. No.: 16/447,854

(22) Filed: Jun. 20, 2019

(65) Prior Publication Data

US 2020/0003871 A1 Jan. 2, 2020

(30) Foreign Application Priority Data

Jul. 2, 2018 (KR) .................. 10-2018-0076302

(51) Int. Cl.
*G02B 26/08* (2006.01)
*G02B 1/11* (2015.01)
*G01S 7/481* (2006.01)
*G01S 17/02* (2020.01)

(52) U.S. Cl.
CPC ........ *G02B 26/0816* (2013.01); *G01S 7/4813* (2013.01); *G01S 17/02* (2013.01); *G02B 1/11* (2013.01); *G01S 7/4816* (2013.01)

(58) Field of Classification Search
CPC ...... G01S 7/4813; G01S 7/4816; G01S 17/02; G01S 7/481; G01S 17/931; G02B 1/11; G02B 26/0816; G02B 5/0816; G02B 13/16; G02B 17/06; G02B 17/0621
See application file for complete search history.

(56) References Cited

U.S. PATENT DOCUMENTS

| | | | |
|---|---|---|---|
| 5,808,763 A * | 9/1998 | Duck | G02B 6/2938 398/79 |
| 10,222,563 B2 | 3/2019 | Hasse et al. | |
| 11,280,889 B2 | 3/2022 | Lee et al. | |
| 2002/0131180 A1* | 9/2002 | Goodman | G02B 6/29367 359/633 |
| 2004/0096150 A1* | 5/2004 | Laudo | G02B 6/124 385/24 |
| 2004/0175072 A1* | 9/2004 | Lam | G02B 6/3572 385/39 |
| 2011/0255303 A1* | 10/2011 | Nichol | G02B 6/0053 362/606 |
| 2011/0277361 A1* | 11/2011 | Nichol | G02B 6/0068 40/541 |
| 2012/0006382 A1* | 1/2012 | Dagli | G02B 17/002 136/246 |

(Continued)

FOREIGN PATENT DOCUMENTS

| | | |
|---|---|---|
| KR | 10-2016-0101037 | 8/2016 |
| KR | 10-2017-0115444 | 10/2017 |
| KR | 10-1814135 | 1/2018 |

*Primary Examiner* — Magda Cruz
(74) *Attorney, Agent, or Firm* — H.C. Park & Associates, PLC (57) ABSTRACT

An optical receiving module may include: a light transmitting body configured to transmit light; a light incidence part through which light is incident into the light transmitting body; and a plurality of reflectors configured to reflect the light incident from the light incidence part a plurality of times, such that the light is incident toward a light receiver unit.

9 Claims, 6 Drawing Sheets

(56) References Cited

U.S. PATENT DOCUMENTS

| | | | |
|---|---|---|---|
| 2015/0219834 A1* | 8/2015 | Nichol | G02B 6/0028 445/24 |
| 2016/0320568 A1* | 11/2016 | Haase | G02B 6/3829 |
| 2019/0154813 A1* | 5/2019 | Lee | G01S 17/48 |
| 2021/0103098 A1* | 4/2021 | Haase | G02B 6/3885 |

\* cited by examiner

OPTICAL RECEIVING MODULE

CROSS-REFERENCES TO RELATED APPLICATION

This application claims priority from and the benefit of Korean Patent Application No. 10-2018-0076302, filed on Jul. 2, 2018, which is hereby incorporated by reference for all purposes as if fully set forth herein.

BACKGROUND

Field

Exemplary embodiments relate to an optical receiving module, and more particularly, to an optical receiving module which can reduce the number of parts such that the size thereof can be reduced.

Discussion of the Background

With the development of vehicle technology, various functions such as autonomous driving and autonomous parking are required. In order to perform such functions, the necessity for a LiDAR (Light Detection And Ranging Sensor) is increasing.

The LiDAR is mounted on a bumper of a vehicle, and detects an object or structure by sensing the area at the front and rear of the vehicle. The LiDAR is installed on glass or in a structure of a vehicle body. The LiDAR detects a target using light.

The LiDAR includes a transmitter for transmitting light and a receiver for receiving incident light. The receiver includes a receiving lens and a reflecting mirror. Light incident on the receiving lens is reflected by the reflecting mirror and incident on a detector.

However, the conventional LiDAR has a focal length at which the light having passed through the receiving lens is received by a detector as the light is reflected by the reflecting mirror. Furthermore, since the reflecting mirror for turning an optical path is installed to reduce the size of the LiDAR, the number of parts may be increased.

Therefore, there is a demand for a device capable of solving the problem.

The related art of the present invention is disclosed in Korean Patent Registration No. 1814135 registered on Dec. 26, 2017 and entitled "LiDAR system".

The above information disclosed in this Background section is only for understanding of the background of the inventive concepts, and, therefore, it may contain information that does not constitute prior art.

SUMMARY

Exemplary embodiments of the present invention provide an optical receiving module which can reduce the number of parts such that the size thereof can be reduced.

Additional features of the inventive concepts will be set forth in the description which follows, and in part will be apparent from the description, or may be learned by practice of the inventive concepts.

In one embodiment, an optical receiving module may include: a light transmitting body configured to transmit light; a light incidence part through which light is incident into the light transmitting body; and a plurality of reflectors configured to reflect the light incident from the light incidence part a plurality of times, such that the light is incident toward a light receiver unit.

The plurality of reflectors may include: a first reflector configured to reflect the light incident from the light incidence part; and a second reflector configured to reflect the light reflected by the first reflector such that the light is incident toward the light receiver unit.

The light incidence part may have an anti-reflective layer disposed thereon to prevent light reflection.

The first reflector may be formed in a curved shape.

The second reflector may be formed in a plane shape.

The light incidence part may be formed in a plane shape, and the second reflector may be inclined toward the first reflector from a plane extended from the light incidence part, and reflect light in the opposite direction of the incidence direction of the light incidence part.

The light incidence part may be formed in a plane shape, and the second reflector may be inclined toward the opposite side of the first reflector from a plane extended from the light incidence part, and reflects light in the same direction as the incidence direction of the light incidence part.

The second reflector may be formed in a curved shape.

The second reflector may be formed at a light incidence side on the other side of the light transmitting body, in order to reflect light in the same direction as the incidence direction of the light incidence part.

The second reflector may be formed at the opposite side of a light incidence side on the other side of the light transmitting body, in order to reflect light in the opposite direction of the incidence direction of the light incidence part.

The optical receiving module may further include an interference filter installed on the light transmitting body such that the light reflected by the second reflector transmits the interference filter.

The light transmitting body may be filled with an optical medium.

The light transmitting body may have a hollow interior.

In accordance with the embodiment of the present invention, the plurality of reflectors may reflect light incident from the light incidence part a plurality of times, such that the light is incident on the light receiver unit. Therefore, since a reflecting mirror for bending an optical path in a LiDAR does not need to be installed, the number of parts included in the LiDAR can be reduced.

Furthermore, since the light incident through the light incidence part is reflected a plurality of times in the light transmitting body, the size of the light receiving module can be reduced even though the optical path is increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereafter, an optical receiving module in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

First, an optical receiving module in accordance with a first embodiment of the present invention will be described.

Figure 1:
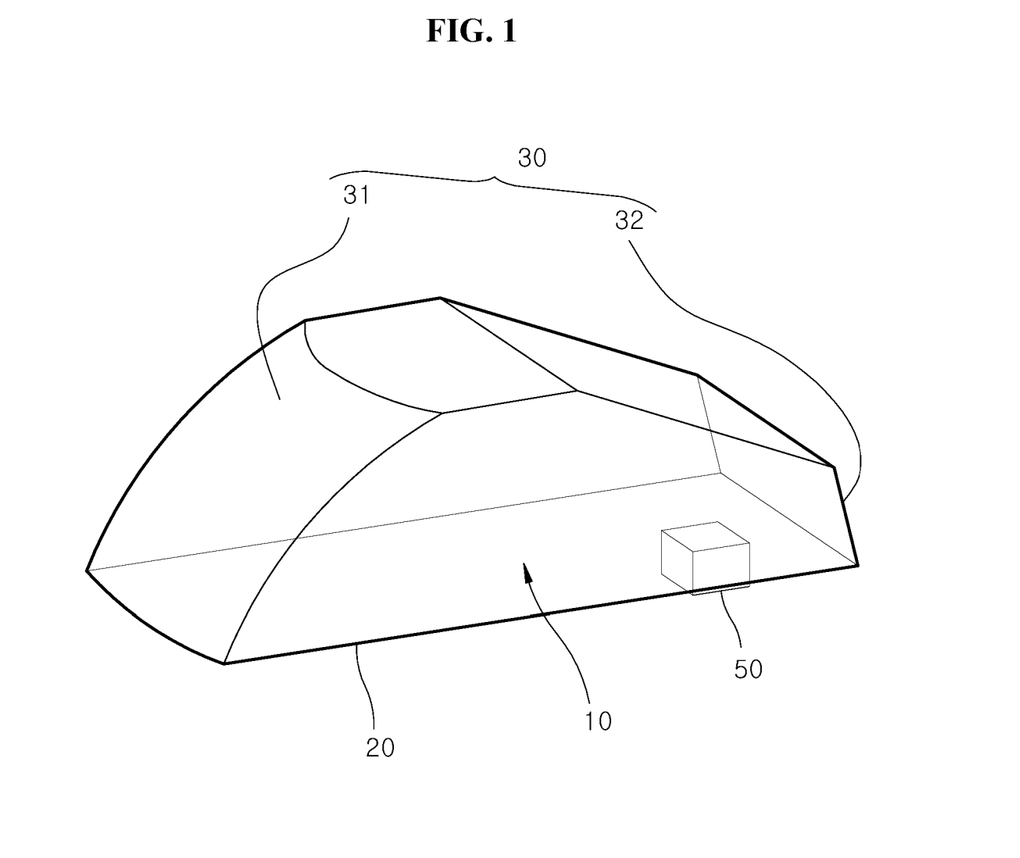
FIG. 1 is a perspective view illustrating an optical receiving module in accordance with a first embodiment of the present invention.
Figure 2:
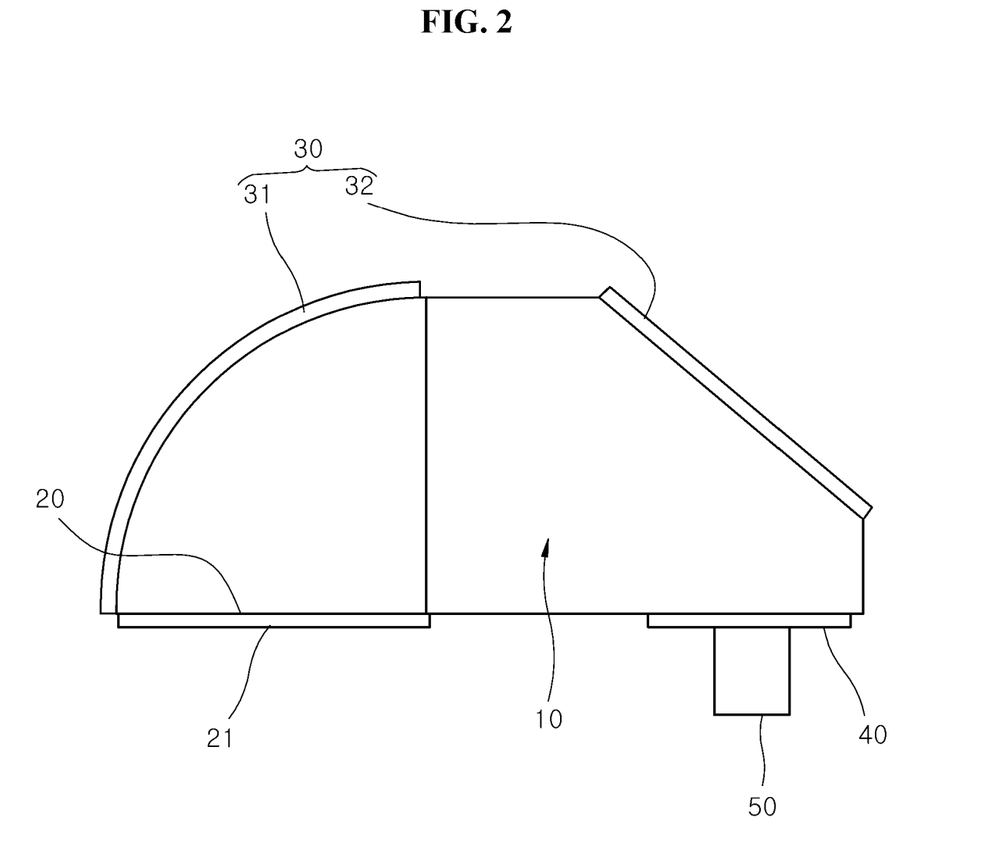
FIG. 2 is a side view illustrating the optical receiving module in accordance with the first embodiment of the present invention.
Figure 3:
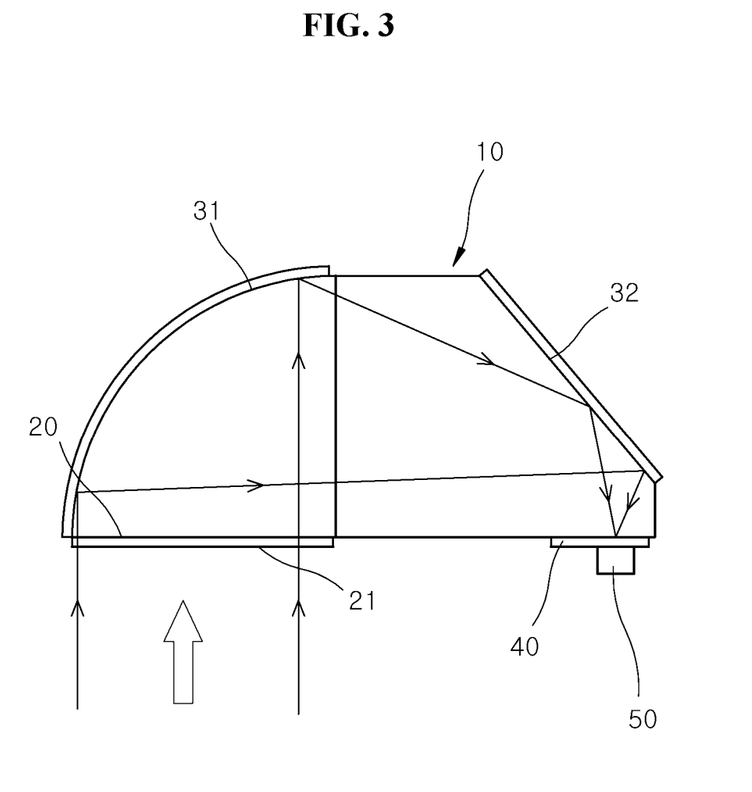
FIG. 3 is a side view illustrating a propagation path of light in the optical receiving module in accordance with the first embodiment of the present invention.

FIG. 1 is a perspective view illustrating an optical receiving module in accordance with a first embodiment of the present invention, FIG. 2 is a side view illustrating the optical receiving module in accordance with the first embodiment of the present invention, and FIG. 3 is a side view illustrating a propagation path of light in the optical receiving module in accordance with the first embodiment of the present invention.

Referring to FIGS. 1 to 3, the optical receiving module in accordance with the first embodiment of the present invention may include a light transmitting body 10, a light incidence part 20 and a plurality of reflectors 30. The optical receiving module may be applied to a light receiver unit 50 of a LiDAR, which is arranged on an external planar surface of the light transmitting body 10.

The light transmitting body 10 may be made of crystal or transparent synthetic resin which can transmit light.

The light transmitting body 10 may be filled with an optical medium. Therefore, light incident on the light transmitting body 10 may propagate through the same optical medium until the light is emitted from the light transmitting body 10.

The light transmitting body 10 may have a hollow interior. At this time, since the light transmitting body 10 is formed of a different material from the internal medium, light may propagate through the different medium.

Through the light incidence part 20, light may be incident on the inside of the light transmitting body 10. The light incidence part 20 may be formed to have an external planar surface such that the incidence angle of light is not changed or bent.

The light incidence part 20 may have an anti-reflective layer 21 disposed thereon to prevent light reflection. Since the anti-reflective layer 21 prevents reflection of light, the light can be prevented from scattering in the light incidence part 20. The anti-reflective layer 21 may be formed by anti-reflective (AR) coating.

The plurality of reflectors 30 may reflect the light incident from the light incidence part 20 a plurality of times, such that the light is incident on the light receiver unit 50. Therefore, since no reflecting mirror needs to be installed to bend the optical path in the LiDAR, the number of parts in the LiDAR can be reduced. Furthermore, since the light incident through the light incidence part 20 is reflected a plurality of times in the light transmitting body 10, the size of the optical receiving module can be reduced even though the optical path is increased.

The plurality of reflectors 30 may include a first reflector 31 and a second reflector 32.

The first reflector 31 may reflect the light incident from the light incidence part 20. The second reflector 32 may reflect the light reflected by the first reflector 31, such that the light is incident on the light receiver unit 50. Therefore, since the light incident on the light incidence part 20 forms an optical path through which the light is reflected from the first and second reflectors 31 and 32 and then incident on the light receiver unit 50, the focal length can be reduced.

At this time, the light reflected by the first reflector 31 may converge on the second reflector 32, and the light reflected by the second reflector 32 may converge on the light receiver unit 50 such that a focal point is formed in the light receiver unit 50. Therefore, the light receiver unit 50 may detect a detection target.

The first reflector 31 may be formed to have a curved inner reflective surface. The first reflector 31 may be disposed on one side of the light transmitting body 10. The first reflector 31 may be inclined from one side of the light incidence part 20 toward the other side of the light transmitting body 10. The first reflector 31 may be opposite to the emission side of the light incidence part 20 such that the light passing through the light incidence part 20 is all reflected.

The curvature of the first reflector 31 may be properly designed in consideration of the length and size of the light transmitting body 10 and the convergence angle of the reflected light.

The second reflector 32 may be formed to have an inner reflective planar surface. At this time, the light incidence part 20 may be formed in a plane shape, and the second reflector 32 may be inclined toward the first reflector 31 from the plane extended from the light incidence part 20. Thus, the light reflected from the inner reflective planar surface of the second reflector 32 may be emitted in the opposite direction (downward direction in FIG. 3) of the incidence direction (upward direction in FIG. 3) in the light incidence part 20.

The light receiver module may further include an interference filter 40 installed on the light transmitting body 10 such that the light reflected by the second reflector 32 transmits the interference filter 40. The interference filter 40 may filter out a specific wavelength of light through interference.

Next, an optical receiving module in accordance with a second embodiment of the present invention will be described. Since the second embodiment has substantially the same structure as the first embodiment except the shape of the second reflector, the same components will be represented by like reference numerals, and the detailed descriptions thereof will be omitted.

Figure 4:
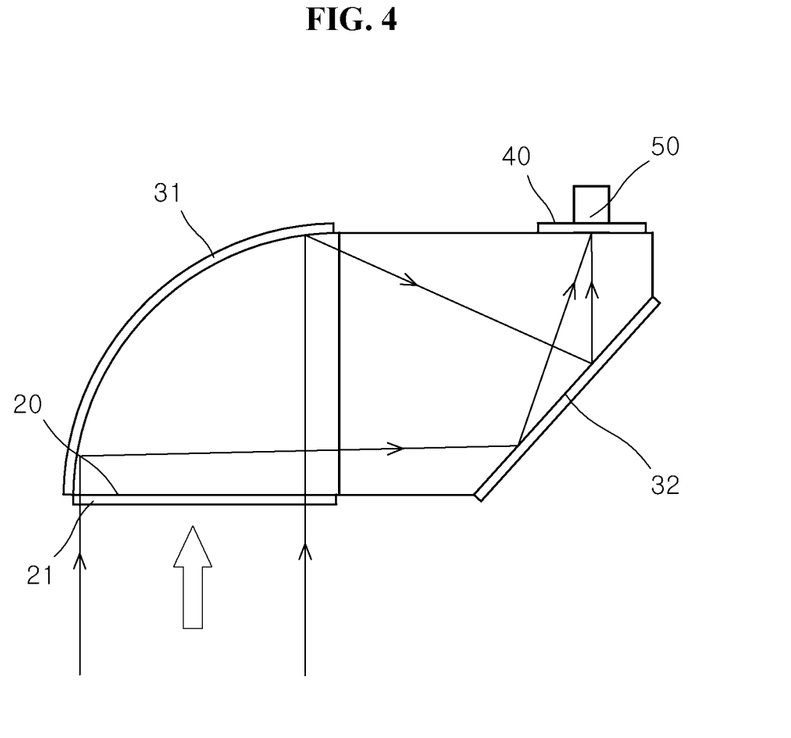
FIG. 4 is a side view illustrating an optical receiving module in accordance with a second embodiment of the present invention.

FIG. 4 is a side view illustrating the optical receiving module in accordance with the second embodiment of the present invention.

Referring to FIG. 4, the optical receiving module in accordance with the second embodiment of the present invention may have a structure in which the first reflector 31 is formed in a curved shape, and the second reflector 32 is formed in a plane shape.

The light incidence part 20 may be formed in a plane shape, and the second reflector 32 may be inclined toward the opposite side of the first reflector 31 from the plane extended from the light incidence part 20. Therefore, the light reflected from the second reflector 32 may be emitted in the same direction (upward direction in FIG. 4) as the incidence direction (upward direction in FIG. 4) in the light incidence part 20.

At this time, the light receiver unit 50 may be positioned at the top of the light transmitting body 10 such that the focal point of light reflected by the second reflector 32 converges.

Next, an optical receiving module in accordance with a third embodiment of the present invention will be described. Since the third embodiment has substantially the same structure as the first embodiment except the shape of a second reflector, the same components will be represented by like reference numerals, and the detailed descriptions thereof will be omitted.

Figure 5:
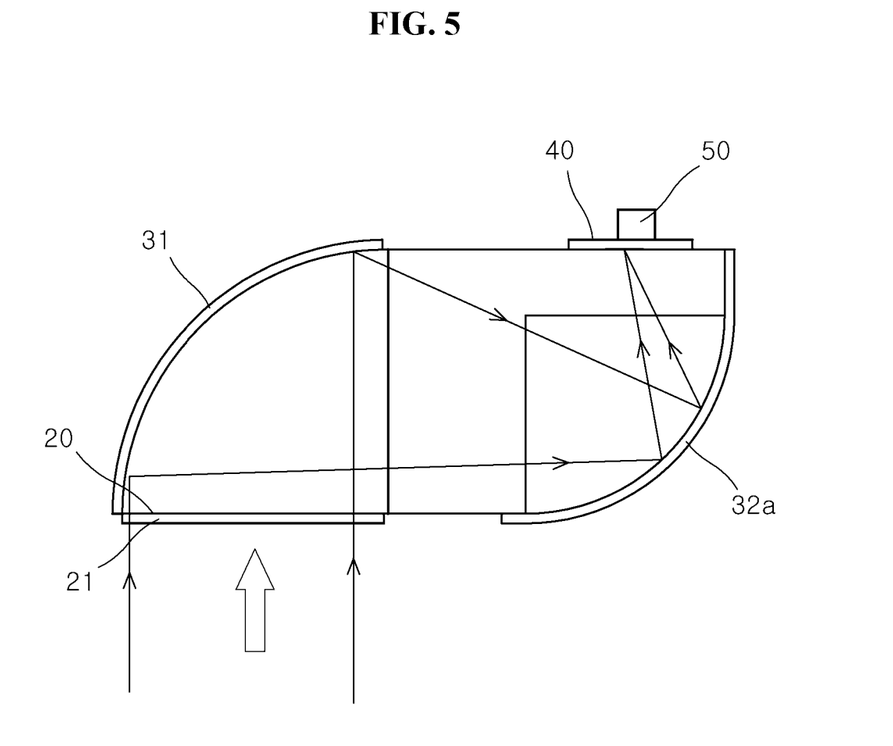
FIG. 5 is a side view illustrating an optical receiving module in accordance with a third embodiment of the present invention.

FIG. 5 is a side view illustrating an optical receiving module in accordance with a third embodiment of the present invention.

Referring to FIG. 5, the optical receiving module in accordance with the third embodiment of the present invention may have a structure in which the first reflector 31 is formed in a curved shape, and a second reflector 32a is formed in a curved shape.

The second reflector 32a may be formed at the light incidence side (bottom side in FIG. 5) on the other side (right side in FIG. 5) of the light transmitting body 10, in order to reflect light in the same direction as the incidence direction in the light incidence part 20. At this time, the light receiver unit 50 may be disposed at the light incidence side on the other side of the light transmitting body 10.

Next, an optical receiving module in accordance with a fourth embodiment of the present invention will be described. Since the fourth embodiment has substantially the same structure as the first embodiment except the second reflector, the same components will be represented by like reference numerals, and the detailed descriptions thereof will be omitted.

Figure 6:
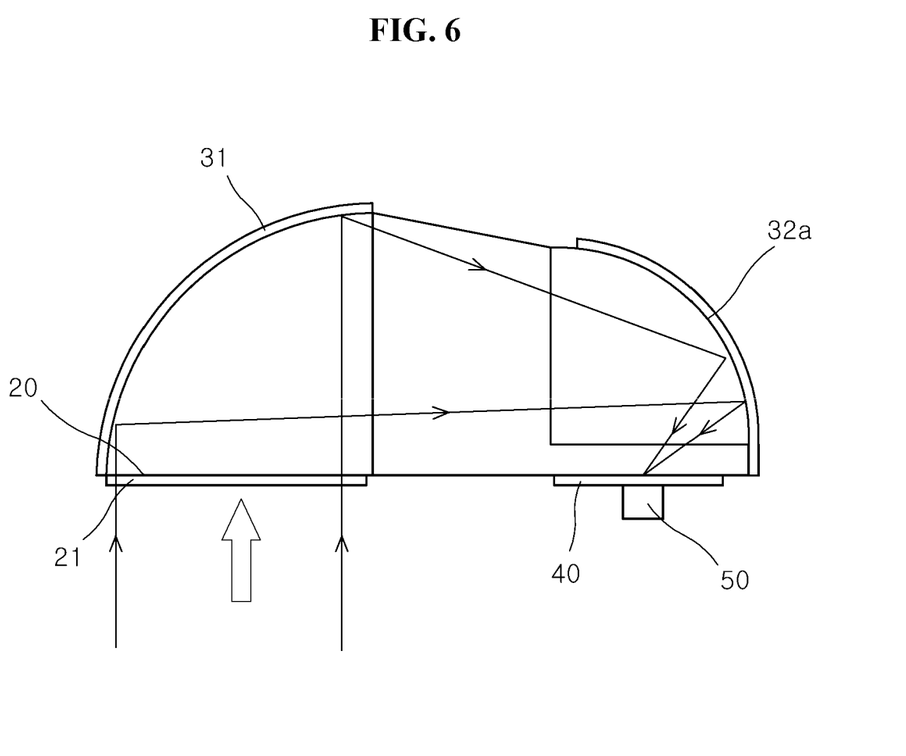
FIG. 6 is a side view illustrating an optical receiving module in accordance with a fourth embodiment of the present invention.

FIG. 6 is a side view illustrating the optical receiving module in accordance with the fourth embodiment of the present invention.

Referring to FIG. 6, the optical receiving module in accordance with the fourth embodiment of the present invention may have a structure in which the first reflector 31 is formed in a curved shape, and the second reflector 32a is formed in a curved shape.

The second reflector 32a may be formed at the opposite side (top side in FIG. 6) of the light incidence side on the other side (right side in FIG. 6) of the light transmitting body 10, in order to reflect light in the opposite direction of the incidence direction in the light incidence part 20. At this time, the light receiver unit 50 may be disposed at the opposite side of the light incidence side on the other side of the light transmitting body 10.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An optical receiving module comprising:
a light transmitting body configured to transmit light;
a light incidence part comprising a first external planar surface through which light is incident into the light transmitting body; and
a plurality of reflectors configured to reflect the light incident from the light incidence part a plurality of times, such that the light is incident toward a light receiver unit,
wherein the plurality of reflectors comprises:
a first reflector configured to reflect the light incident from the light incidence part; and
a second reflector configured to reflect the light reflected by the first reflector to direct the light toward the light receiver unit,
wherein the first reflector has a curved inner reflective surface,
wherein the second reflector has an inner reflective planar surface, and
wherein one of the curved inner reflective surface of the first reflector and the first external planar surface of the light incident part extends smoothly to a second external planar surface on which the light receiver unit is disposed.

2. The optical receiving module of claim 1, further comprising an anti-reflective layer disposed on the first external planar surface of the light incidence part to prevent light reflection.

3. The optical receiving module of claim 1, wherein the second reflector is inclined to face the first reflector and the light incidence part, and reflects light in an opposite direction of an incidence direction of the light incidence part.

4. The optical receiving module of claim 1, wherein the second reflector is inclined to face the first reflector and the light receiver unit, and reflects light in a same direction as an incidence direction of the light incidence part.

5. The optical receiving module of claim 1, wherein the second reflector is facing the first reflector and is not facing the light incidence part, in order to reflect light in a same direction as an incidence direction of the light incidence part.

6. The optical receiving module of claim 1, wherein the second reflector is facing the first reflector and the light incidence part, in order to reflect light in an opposite direction of an incidence direction of the light incidence part.

7. The optical receiving module of claim 1, further comprising an interference filter installed on the light transmitting body such that the light reflected by the second reflector is transmitted by the interference filter.

8. The optical receiving module of claim 1, wherein the light transmitting body is filled with an optical medium.

9. The optical receiving module of claim 1, wherein an inside of the light transmitting body defines a hollow interior.

* * * * *